July 20, 1965
C. E. HUMES
3,195,922
STEERING ASSEMBLY FOR TRAILERS
Filed Nov. 28, 1962
5 Sheets-Sheet 1
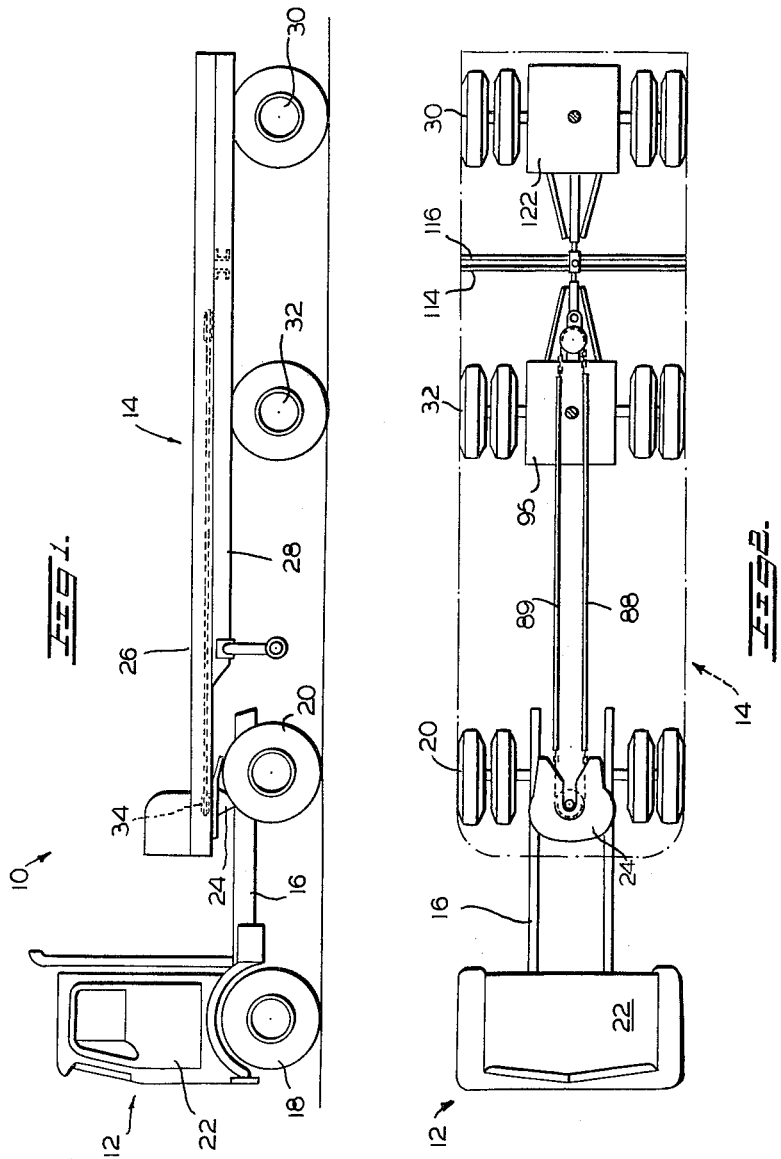
INVENTOR
CARL E. HUMES
BY Stowell & Stowell
ATTORNEYS

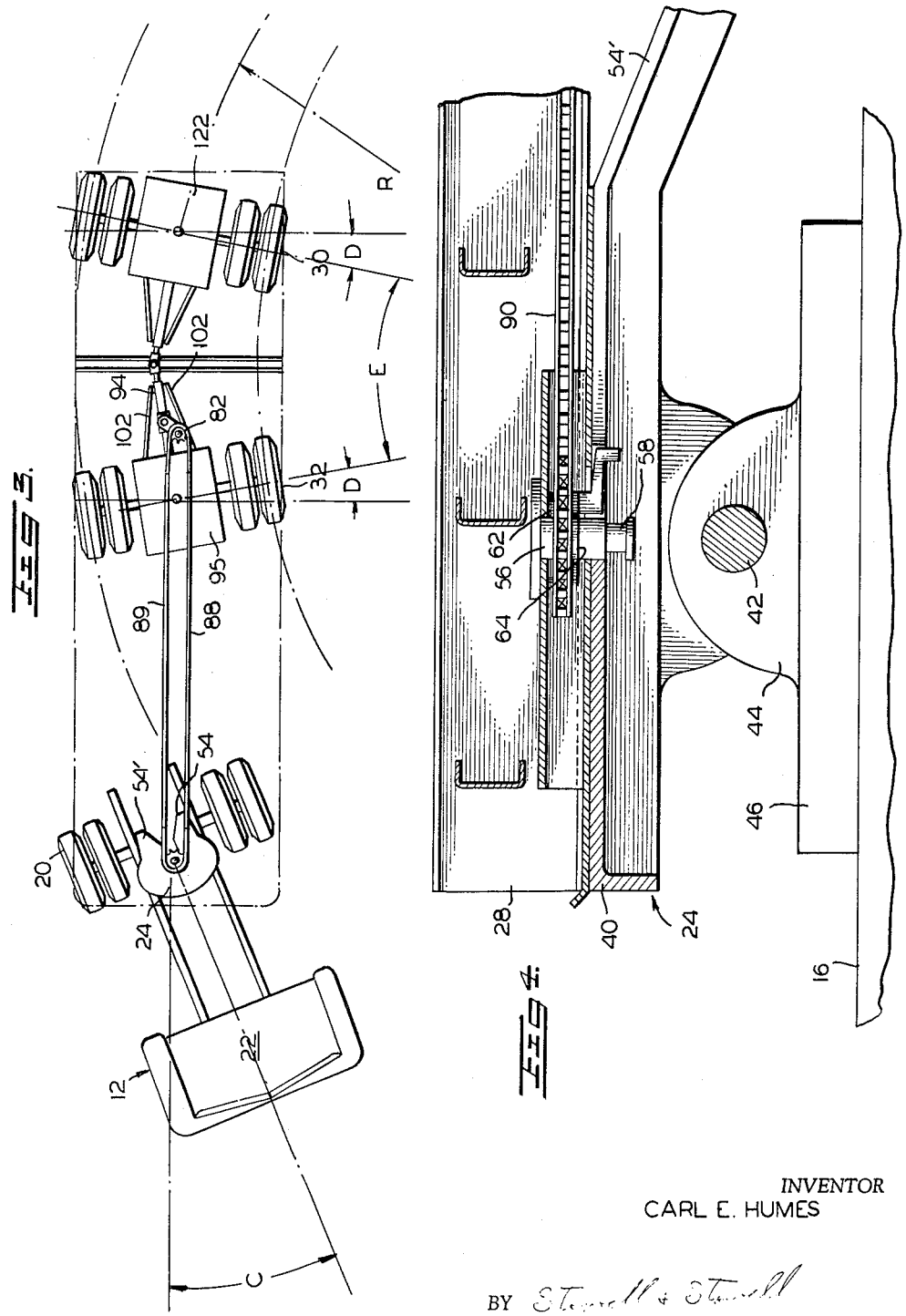

July 20, 1965  C. E. HUMES  3,195,922
STEERING ASSEMBLY FOR TRAILERS
Filed Nov. 28, 1962  5 Sheets-Sheet 3

INVENTOR
CARL E. HUMES

BY Stowell & Stowell

ATTORNEYS

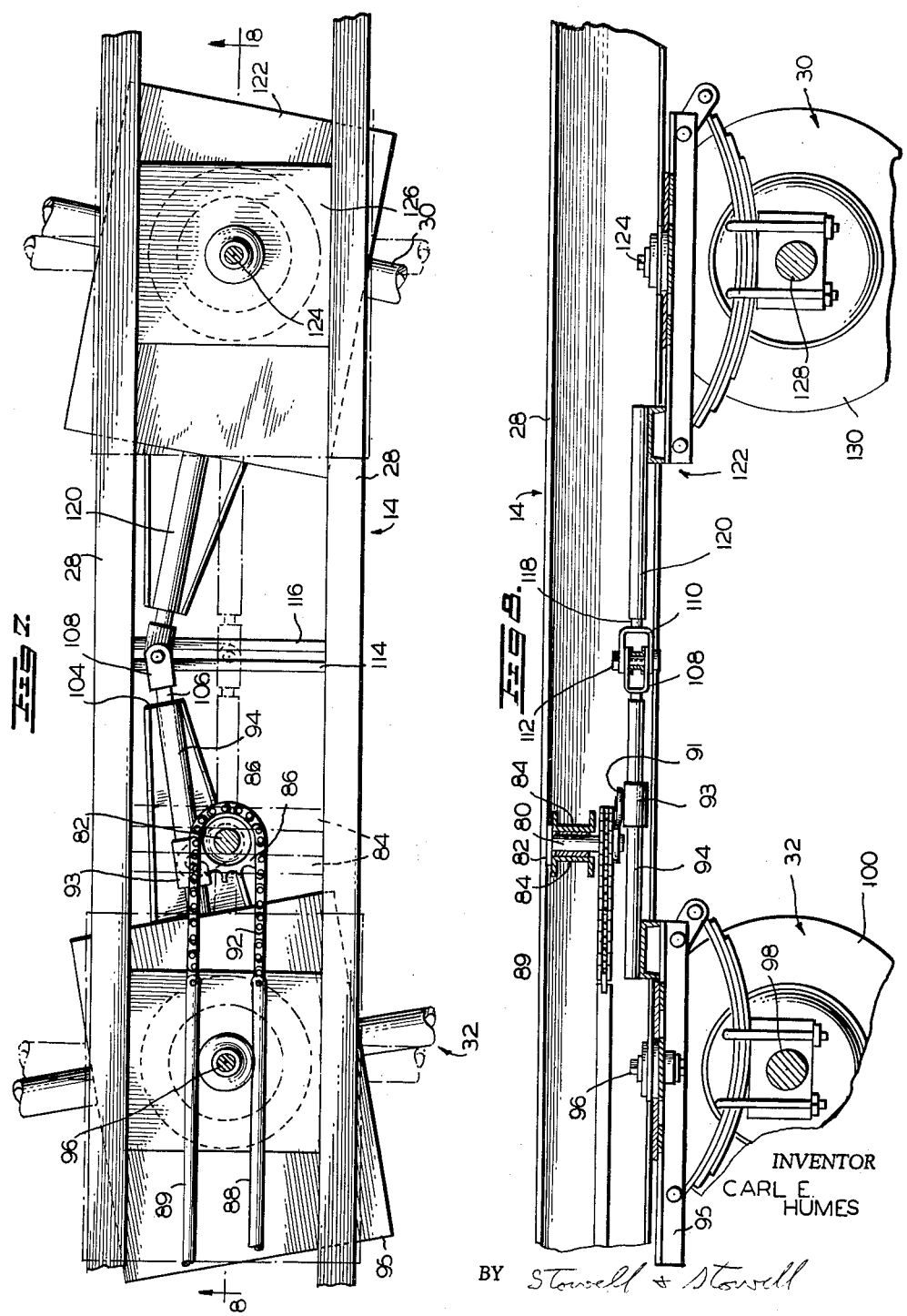

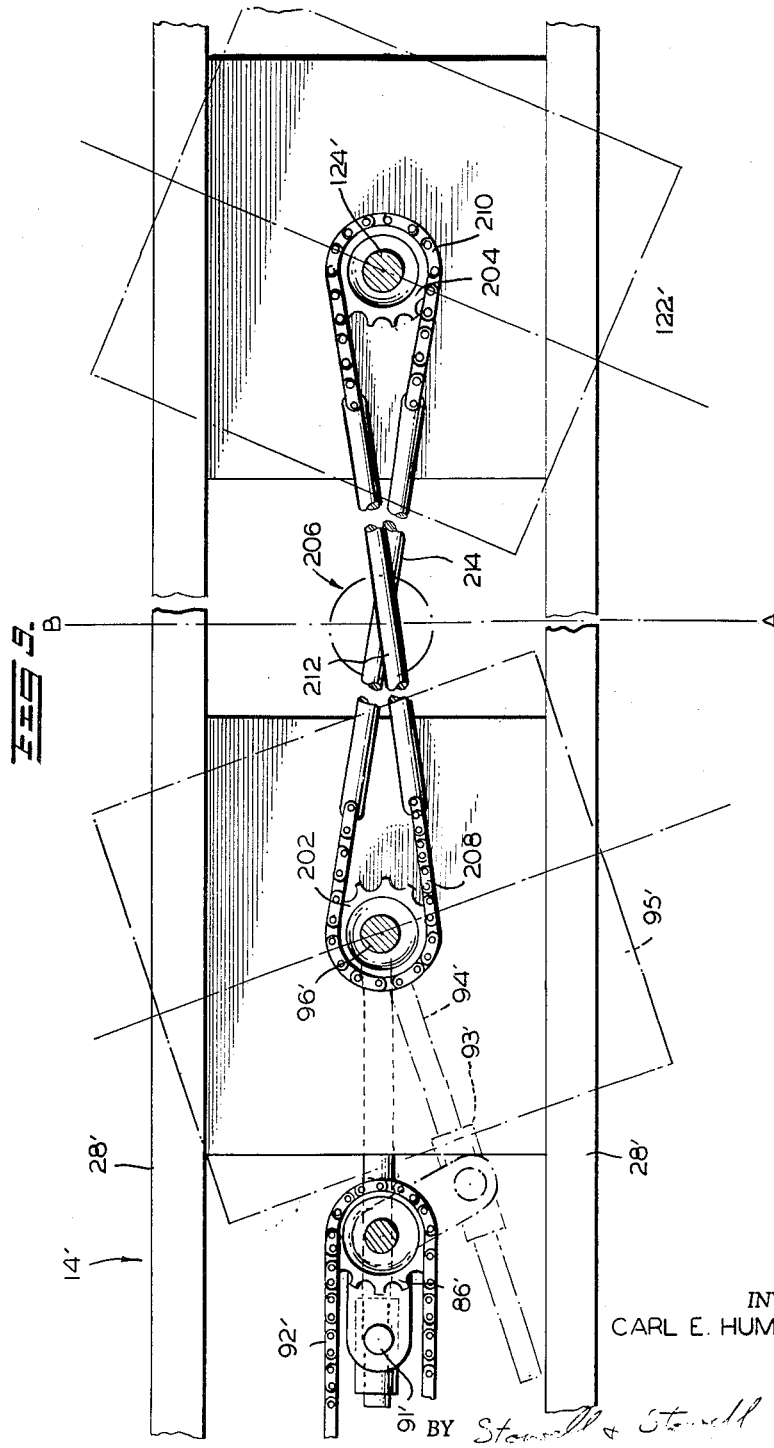

3,195,922
STEERING ASSEMBLY FOR TRAILERS
Carl E. Humes, 907 Franklin Ave., Steubenville, Ohio
Filed Nov. 28, 1962, Ser. No. 240,550
3 Claims. (Cl. 280—426)

This invention relates to improvements in a steering assembly for trailers and, in particular, the invention relates to means for cooperatively steering wheeled axle assemblies of trailers adapted to be towed by tractors.

It is a particular object of the present invention to provide steering means for trailers having at least a pair of spaced wheeled axle assemblies.

A further object is to provide such steering means whereby each of the wheeled axle assemblies for the trailer are cooperatively pivoted as the towing tractor pivots and to such an assembly wherein the rate of turn of the trailer wheeled axle assemblies relative to the turning of the towing tractor is predetermined and varies from a maximum at the beginning of a turn and decreases as the tractor's degree of turn increases.

Another object of the present invention is to provide a steering assembly for plural wheeled axles of towed trailers whereby tire drag is substantially reduced.

Another object of the present invention is to provide improved steering means for tractor towed trailers that is relatively simple and sturdy in construction and may be readily applied to conventional fifth wheel towed trailers.

A further object of the present invention is to provide such a system which requires no modification of conventional fifth wheel type tractors.

A further object is to provide new and improved means for interconnecting wheeled axle assemblies of trailers with the fifth wheel assembly of a towing tractor whereby turning of the tractor fifth wheel translates cooperative turning movement to the wheeled axle assemblies of the trailer.

These and other objects and advantages of the present invention are provided by steering means for a trailer of the type wherein the front end is pivotally connected by a king pin to a fifth wheel to a towing vehicle, the fifth wheel including a rearwardly opening king pin receiving slot, and the rearward end of the trailer is supported on a wheeled axle assembly comprising a toothed wheel mounted to the trailer for rotation in a generally horizontal plane above the fifth wheel of the towing vehicle, a horizontally offset and generally vertically extending crank secured to rotate with the toothed wheel and adapted to engage the king pin receiving slot in the towing vehicle fifth wheel, a second toothed wheel mounted to the trailer for rotation in a generally horizontal plane rearwardly of the first toothed wheel, chain means about the first and second toothed wheels interconnecting the first and second toothed wheel for simultaneous rotation, a generally horizontally extending arm secured to rotate with the second toothed wheel, a tongue centrally extending from the wheeled axle assembly, the tongue extending generally normal to the longitudinal axis of the wheeled axle assembly, and bearing means slidably interconnecting the extended end of the arm and the tongue.

The invention will be more particularly described with reference to the illustrative embodiments thereof shown in the accompanying drawings wherein:

FIG. 1 is a side elevational view of a tractor-trailer combination embodying the steering mechanism of the present invention;

FIG. 4 is an enlarged fragmentary detailed view of the fifth wheel of a towing vehicle showing the means interconnecting a towed trailer and the fifth wheel;

FIG. 5 is an enlarged fragmentary top plan view of the rearward portion of the towing tractor showing the interrelationship between the fifth wheel of the tractor and the improved steering mechanism of the invention;

FIG. 6 is an inverted perspective view of the means carried by the trailer for interconnecting the trailer and the fifth wheel of the tractor;

FIG. 7 is an enlarged fragmentary top plan view of the pair of wheeled axle assemblies of the trailer illustrated in FIGS. 1, 2 and 3 showing in full lines the position of these mechanisms with the vehicle turning as illustrated in FIG. 3 and in phantom lines with the vehicle running on a straight path as illustrated in FIGS. 1 and 2;

FIG. 8 is a section substantially on line 8—8 of FIG. 7; and

FIG. 9 is an enlarged fragmentary detailed view similar to that illustrated in FIG. 7 of a modified form of the present invention.

Figure 2:
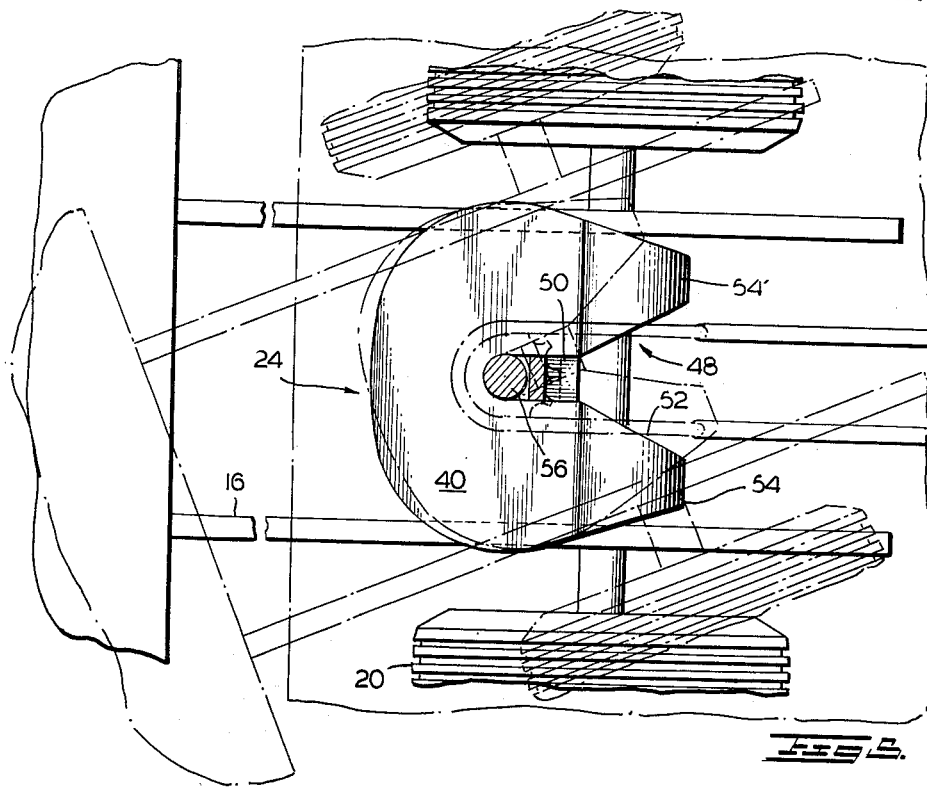
FIG. 2 is a top plan view of a portion of the structures shown in FIG. 1 illustrating one form of the steering assembly of the present invention applied to a trailer having a pair of spaced independently steerable wheeled axle assemblies.
Figure 3:
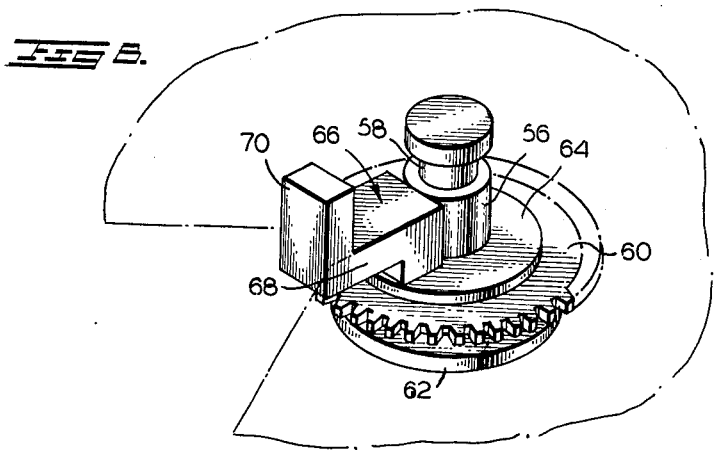
FIG. 3 is a view similar to that shown in FIG. 2 with the tractor and each of the pair of wheeled axle assemblies of the trailer shown in a curve.

Referring to the drawings and, in particular, to FIGS. 1, 2 and 3, there is generally illustrated a tractor-trailer assembly generally designated 10. The tractor-trailer assembly includes a towing tractor 12 and a trailer 14.

The towing tractor 12 is of conventional design and includes a chassis or frame 16 having steerable front wheel assemblies 18 and non-steerable drive wheel assemblies 20. The tractor also includes a cab 22 and a conventional fifth wheel assembly 24 providing the means for supporting the forward end of the trailer 14.

The trailer 14 generally includes a bed 26 supported on frame members 28 which frame members are supported at the rearward end of a wheeled axle assembly generally designated 30 and a further wheeled axle assembly 32 positioned intermediate the rear wheeled axle assembly 30 and the front end of the trailer. The trailer also includes means 34 for connecting the trailer and the fifth wheel 24 of the tractor.

Referring particularly to FIGS. 4, 5 and 6, the tractor fifth wheel assembly 24 includes the fifth wheel platform 40 which is pivotally mounted for limited tilting movement on a pin 42 mounted in a boss 44 secured to a member 46 mounted to the tractor frame 16. The fifth wheel assembly is provided with a rearwardly extending slot generally designated 48 which slot includes a straight portion 50 and an outwardly and rearwardly tapered portion 52. The platform 40 of the fifth wheel assembly 24 includes downwardly curved portions 54 and 54' adjacent the tapered portion of the slot 52.

The forward end of the trailer frame 28 has secured thereto a king pin 56, the lower end of which is stepped as at 58 to receive king pin locking means carried by the fifth wheel assembly 24 and not shown in the drawings.

The king pin 56 has rotatably mounted thereon a first toothed wheel 60 and upper and lower circular plate members 62 and 64. The lower plate 64 has rigidly secured thereto a crank 66 which includes a horizontally extending arm portion 68 and a depending end member 70. The arm 68 and the pin 70 are adapted to be received in the straight section 50 of the fifth wheel slot 48 when the king pin 56 is in its latched position in the fifth wheel as illustrated in FIGS. 4, 5 and 6. With this arrangement as the fifth wheel pivots relative to the trailer frame 28 upon turning of the tractor, the crank 66 is caused to correspondingly pivot and rotate the first geared wheel 60 secured thereto.

The amount of rotation of the wheel 60 is in direct relation to the degrees of pivoting of the tractor relative to the trailer 14.

Referring particularly to FIGS. 7 and 8, the trailer 14 rotatably supports a pin 80 in bearing means 82 between cross frame members 84. The pin 80 is mounted on the center line of the trailer rearwardly of the first wheeled axle assembly 32. Adjacent the lower end of the pin 80 is secured a second toothed wheel 86. The first toothed wheel 60 and the second toothed wheel 86 are interconnected by suitable chain means whereby rotation of the first toothed wheel 60 simultaneously rotates the second toothed wheel 86. In the illustrated form of the invention, the interconnecting means between the first and second toothed wheels 60 and 86 comprise a pair of elongated stringer members 88 and 89 and a pair of chain members 90 at the forward end and 92 at the rearward end. The chain members 90 and 92 have links adapted to engage the teeth of the toothed wheels 60 and 86 and the length of the chain members 90 and 92 are such that a portion of each respective chain is always in engagement with its toothed wheel during normal operation of the steering system.

Secured to the lower end of the pin 80 is a lever arm member 91 which lever arm is directed longitudinally rearwardly when the tractor and the trailer are moving in a straight path as illustrated in FIG. 2. The extended end of the lever arm 91 has mounted thereon a sleeve bearing member 93. The sleeve bearing member 93 slidably engages a cooperating cylindrical bearing surface of a first tongue member 94. The tongue member 94 is secured to a steering frame assembly 95. The frame assembly 95 is pivoted on vertical pin means 96 carried by the main frame of the trailer. The frame 95 suitably supports one or more axles 98 carrying the wheels 100 of the forward wheeled axle assembly 32. It will be noted that the tongue 94 extends horizontally rearwardly from the rear end of the frame 95 and lateral movement of the tongue 94 causes the axle 98 to pivot along with the frame assembly 95 about the pivot pin 96 to effectively steer the wheel axle assembly 32. Where desired, lateral bracing 102 may be employed to stabilize the tongue 94.

The rearward extended end 104 of the first tongue 94 slidably receives a rod 106, the rearward extended end of which has secured thereto a clevis member 108. The clevis member 108 is pivoted to a second clevis member 110 by a vertical pin 112. The vertical pin 112 is engaged by a pair of rails 114 and 116 whereby when the first tongue member 94 is pivoted, the pin 112 slides between rail members 114 and 116 in a path transverse to the longitudinal axis of the trailer.

The clevis member 110 is secured to a rod 118 which is slidably and telescopically received in the forward end of a second tongue member 120. The second tongue member 120 is rigidly secured at its rearward end to frame assembly 122. The frame assembly 122 is mounted for pivotal movement on vertical pin means 124 secured to the rearward portion of plate member 126 supported between the frame members 28 of the trailer. The frame 122 supports the most rearward wheeled axle assembly 30 which includes axle 128 and wheels 130. With this assembly as the tongue 120 is pivoted by transverse movement of its clevis member 110, the axle 128 through the frame assembly 122 is pivoted in the reverse direction to the pivoting of axle 98 of the wheeled axle assembly 32.

In operation of this form of the invention, turning of the tractor causes the crank 66 to rotate the first toothed wheel 60 which in turn rotates the second toothed wheel 86 through the interconnecting chain means. Rotation of the second toothed wheel 86 causes the lever arm 91 to rotate which, in turn, pivots the first tongue 94 through the sleeve bearing 93. Pivoting of the tongue 94 pivots the axle 98 and its connected wheels for steering of wheeled axle assembly 32. Movement of the tongue 94 brings about a generally corresponding and opposite movement of the axle 128 as hereinabove described. It will be particularly noted that the first portion of the movement of the arm 91 causes a substantial movement in both tongues 94 and 120 as there is very little sliding movement between the sleeve bearing 93 and the tongue 94. However, as the arm 91 continues to rotate, the motion imparted to the tongue 94 decreases as a greater portion of the pivotal movement of the arm is taken up in sliding movement between the sleeve bearing 93 and the cylindrical surface of the tongue 94. It will be appreciated that if by some means the second toothed wheel 86 were pivoted beyond the point where the arm 91 is normal to the longitudinal axis of the trailer, the tongue 94 would be returned to a neutral position and the wheeled axle assembly 32 returned to a straight running position.

The relative turning rates of the wheeled axle assemblies 30 and 32 may be readily varied by changing the ratio between the first geared wheel 60 to the second geared wheel 86; the length of the lever arm 91; the distance between the pin 96 and the point of contact of the sleeve bearing 92 with the tongue 94; and the relative length of the tongues 94 and 120.

A preferred arrangement is provided in a tractor-trailer assembly wherein the trailer is 35′0″ long; the distance between the trailer king pin and the center of wheeled axle assembly 30 is 30′0″; the distance between the trailer king pin and the center of wheeled axle assembly 32 is 21′0″; the distance between the pivot pin 96 and the center of the paired rails 114 and 116 is 55″; and the distance between the pivot pin 124 and the center of rails 114 and 116 is 55.″ With this arrangement, Table I shows the degrees of turn of wheeled axle assemblies 30 and 32 for a corresponding degree of turn of the towing tractor.

TABLE I

| Tractor Angle "C" | Angle of Axle Assemblies 30 and 32 "D" | Total Steering Angle of Trailer "E" | Radius of Turn of Trailer "R" |
| --- | --- | --- | --- |
| 22.5° | 5.0° | 10.0° | 52′7″ |
| 45.0° | 8.5° | 17.0° | 31′0″ |
| 67.5° | 10.0° | 20.0° | 26′4″ |
| 90.0° | 10.0° | 20.0° | 26′4″ |

Referring particularly to FIG. 9 of the drawings, a modified form of the present invention is illustrated and wherein parts corresponding to elements shown in FIGS. 1 through 8 are provided with primed reference characters. The forward end of the trailer 14′ is identical to the forward end of the trailer 14 and the chain member 92 passes about a second toothed wheel 86′ having connected thereto a lever arm 91′. The lever arm 91′ pivotally mounts a sleeve bearing member 93′ which is slidable on the external surface of tongue member 94′. The tongue member is secured to frame assembly 95′ carrying the forward axle and wheels not shown in FIG. 9. The pivot pin 96′, which pivotally mounts the frame assembly 95′ to the trailer frame, has secured thereto a third toothed wheel 202 whereby when the frame assembly 95′ is pivoted through its connected tongue 94′, the third toothed wheel 202 is similarly pivoted. The rear frame assembly 122′ for the rear axle and wheel assembly, not shown in FIG. 9, is pivotally mounted to the trailer frame by pivot pin means 124′. Pivot pin 124′, like pivot pin 96′, has secured thereto a fourth toothed wheel 204. Toothed wheel 204 may be the same diameter as toothed wheel 202 whereby the rate of rotation of frame assembly 122′ will be the same as for frame assembly 95′. Or, where desired, the diameters of the two toothed wheels may be different to obtain different rates of rotation for the pair of axle assemblies. Cross-connected chain means generally designated 206 interconnect the toothed wheels 202 and 204. The chain assembly 206 includes a forward chain section 208, a rearward chain section 210, and a pair of rod elements 212 and 214, which are cross-connected to opposite ends of the chain portions 208 and 210 whereby the frames 95' and 122' rotate in opposite directions. By the proper selection of lever arm, and third and fourth toothed wheels 202 and 204, the rate of turn of the pair of frame assemblies 95' and 122' relative to the tractor and relative to each other may be effectively varied. In this form of the invention and in the form shown in FIGS. 1 through 8, since the rear wheeled axle assembly and the forward wheeled axle assembly pivot in opposite directions, it is possible to add a further fixed wheeled axle assembly intermediate the steerable wheeled axle assemblies without introducing tire drag on any of the three assemblies.

In FIG. 9, the position of such a third wheeled axle assembly is indicated by line A-B.

From the foregoing description, it will be seen that the present invention fully accomplishes the aims and objects hereinabove set forth to provide an improved steering means for towed trailers.

I claim:

1. Steering means for a trailer of the type wherein the front end is pivotally connected by a king pin to a fifth wheel of a towing vehicle, the fifth wheel including a rearwardly opening king pin receiving slot, and the rearward end of the trailer is supported on a pair of longitudinally spaced rearwardly positioned pivotally mounted wheeled axle assemblies comprising a first toothed wheel mounted to the trailer for rotation in a generally horizontal plane above the fifth wheel of the towing vehicle, a horizontally offset and generally vertically depending crank secured to rotate with the first toothed wheel and engage the king pin receiving slot in the towing vehicle fifth wheel, a second toothed wheel mounted to said trailer for rotation in a generally horizontal plane rearwardly of the first toothed wheel, chain means about the first and second toothed wheels interconnecting the first and second toothed wheels for simultaneous rotation, a generally horizontally extending arm secured to rotate with said second toothed wheel, a tongue centrally extending from the most forwardly of the pair of wheeled axle assemblies, said tongue extending generally normal to the longitudinal axis of the said most forwardly of the pair of wheeled axle assemblies, bearing means slidably interconnecting the extended end of said arm and said tongue and means interconnecting the most forwardly of the pair of wheeled axle assemblies and the other of said pair of wheeled axle assemblies, said interconnecting means including means for pivoting said other of the wheeled axle assemblies in the opposite direction to the direction of pivoting of the most forward of the pair of wheeled axle assemblies and the rear wheels of the towing vehicle to provide a coordinated turning path for said pair of wheeled axle assemblies.

2. Steering means for a trailer of the type wherein the front end is pivotally connected by a king pin to a fifth wheel of a towing vehicle, the fifth wheel including a rearwardly opening king pin receiving slot, and the rearward end of the trailer is supported on first and second pivotally mounted wheeled axle assemblies comprising a first toothed wheel mounted to the trailer for rotation in a generally horizontal plane above the fifth wheel of the towing vehicle, a horizontally offset and generally vertically depending crank secured to rotate with the first toothed wheel and engage the king pin receiving slot in the towing vehicle fifth wheel, a second toothed wheel mounted to said trailer for rotation in a generally horizontal plane rearwardly of the first toothed wheel, chain means about the first and second toothed wheels interconnecting the first and second toothed wheels for simultaneous rotation, a generally horizontally extending arm secured to rotate with said second toothed wheel, a first tongue centrally extending from said first wheeled axle assembly, said first tongue extending generally normal to the longitudinal axis of the first wheeled axle assembly, bearing means slidably interconnecting the extended end of said arm and said first tongue, said second pivotally mounted wheeled axle assembly positioned rearwardly of the first wheeled axle assembly, a second tongue centrally extending from said second wheeled axle assembly, said second tongue extending generally normal to the longitudinal axis of the second wheeled axle assembly, means pivotally interconnecting said first and second tongues, and transverse guide means for said interconnecting means.

3. Steering means for a trailer of the type wherein the front end is pivotally connected by a king pin to a fifth wheel of a towing vehicle, the fifth wheel including a rearwardly opening king pin receiving slot, and the rearward end of the trailer is supported on first and second pivotally mounted wheeled axle assemblies comprising a first toothed wheel mounted to the trailer for rotation in a generally horizontal plane above the fifth wheel of the towing vehicle, a horizontally offset and generally vertically depending crank secured to rotate with the first toothed wheel and engage the king pin receiving slot in the towing vehicle fifth wheel, a second toothed wheel mounted to said trailer for rotation in a generally horizontal plane rearwardly of the first toothed wheel, chain means about the first and second toothed wheels interconnecting the first and second toothed wheels for simultaneous rotation, a generally horizontally extending arm secured to rotate with said second toothed wheel, a tongue centrally extending from said first wheeled axle assembly, said tongue extending generally normal to the longitudinal axis of the first wheeled axle assembly, bearing means slidably interconnecting the extended end of said arm and said tongue, a third toothed wheel secured to rotate in a generally horizontal plane with said first wheeled axle assembly, said second pivotally mounted wheeled axle assembly positioned rearwardly of the first wheeled axle assembly, a fourth toothed wheel secured to rotate in a generally horizontal plane with the second wheeled axle assembly, and further chain means cross-connecting the third and fourth toothed wheels.

References Cited by the Examiner

UNITED STATES PATENTS

| | | | |
|---|---|---|---|
| 1,782,265 | 11/30 | Hease | 280—100 |
| 2,445,134 | 7/48 | Curell | 280—426 X |
| 2,793,052 | 5/57 | Googe | 280—426 |
| 3,149,858 | 9/64 | Gilbert | 280—442 |

FOREIGN PATENTS 580,933   8/58   Italy.

A. HARRY LEVY, *Primary Examiner.*

LEO FRIAGLIA, *Examiner.*